United States Patent [19]
Schopp

[11] 3,983,316
[45] Sept. 28, 1976

[54] TURNTABLE SPEED CONTROL SYSTEM

[75] Inventor: James Conrad Schopp, Indianapolis, Ind.

[73] Assignee: RCA Corporation, New York, N.Y.

[22] Filed: Mar. 17, 1975

[21] Appl. No.: 559,098

[52] U.S. Cl. .............................. 178/6.6 P; 360/73; 178/6.6 DD; 179/100.1 S; 318/314; 318/327
[51] Int. Cl.² ..................... H04N 5/76; G11B 19/28
[58] Field of Search ........................ 360/73, 70, 74; 178/6.6 P, 6.6 DD, 6.6 A, 6.6 R; 179/100.1 B, 100.1 S, 100.4 E; 318/314, 318, 327, 269, 279; 274/1 D

[56] References Cited
UNITED STATES PATENTS

| | | | |
|---|---|---|---|
| 2,491,243 | 12/1949 | Anderson | 274/1 D |
| 2,885,208 | 5/1959 | Pranter | 179/100.1 S |
| 3,241,023 | 3/1966 | Eby | 318/314 |
| 3,821,604 | 6/1974 | Walraven | 318/314 |
| 3,829,612 | 8/1974 | Beyers | 178/6.6 A |
| 3,873,643 | 3/1975 | Boltz | 178/6.6 R |
| 3,873,990 | 3/1975 | Wilber | 360/36 |
| 3,885,206 | 5/1975 | Hort | 318/314 |

Primary Examiner—Bernard Konick
Assistant Examiner—Alan Faber
Attorney, Agent, or Firm—Eugene M. Whitacre; William H. Meagher; Dilip A. Kulkarni

[57] ABSTRACT

In a video disc system for recovering prerecorded signals from a disc record by a signal pickup including a turntable, turntable drive means, and turntable speed adjusting means, a turntable speed control system is provided for maintaining the rotation of the turntable at a predetermined speed. Means responsive to the rotation of the turntable generate sample pulses having a frequency which is a function of the actual speed of rotation of the turntable. The sample pulse occur at a predetermined frequency when the turntable is rotating at the predetermined speed. Means are employed for generating a sawtooth-shaped reference wave having a frequency which is a multiple of the predetermined frequency. A sample-and-hold circuit is coupled to the sample pulse generating means and reference wave generating means for determining the magnitude of the reference wave during the occurrence of each of the sample pulses for developing a speed error correction signal. The magnitude of the speed error correction signal is a function of the phase deviation between the sample pulse train and the reference wave. The adjusting means coupled to the sample-and-hold circuit and responsive to the speed error correction signal maintain the rotation of the turntable at the predetermined speed.

9 Claims, 4 Drawing Figures

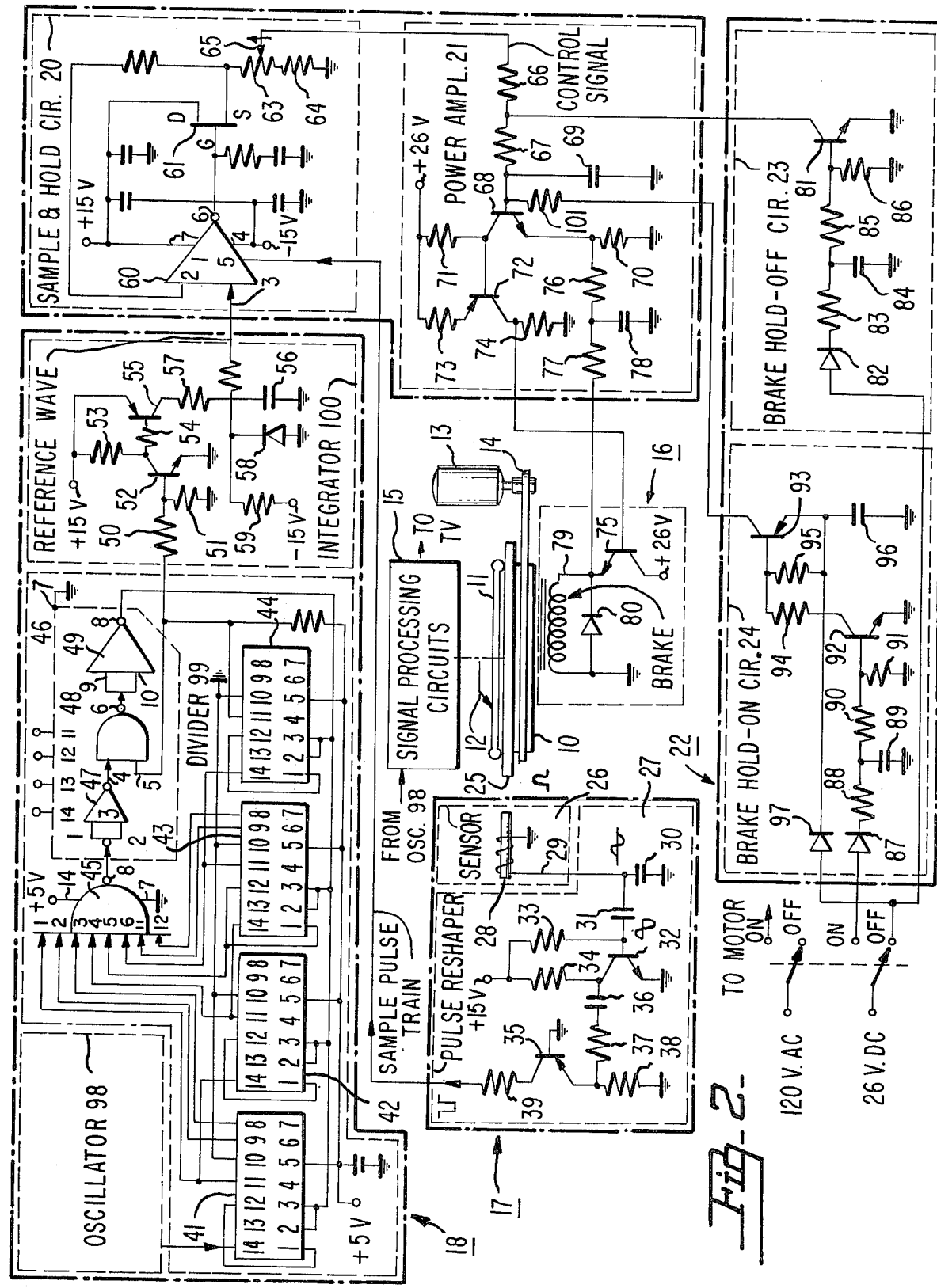

TURNTABLE SPEED CONTROL SYSTEM

The present invention pertains to a turntable speed control system suitable for use with a video disc system.

BACKGROUND OF THE INVENTION

In certain video disc systems, video information is recorded by means of geometric variations in the bottom of a smooth spiral groove on the surface of a disc record. The disc surface includes a coating of conductive material which is preferably covered with a thin deposit of dielectric material. A signal pickup engages the spiral groove and includes a conductive surface which, together with the conductive coating and the dielectric deposit of the disc record, form a capacitor. When the disc record is rotated, an edge of the conductive surface of the signal pickup, while riding in the disc record groove, recovers capacitive variations due to the geometric variations in the bottom of the spiral groove. The capacitive variations, indicative of the prerecorded video information (e.g., in the NTSC format), are applied to a suitable signal processing circuit and electrical signals obtained therefrom are then coupled to a conventional television receiver for reproduction. The variable capacitor concept, as applied to video disc systems, is described in detail in the U.S. Pat. No. 3,842,194, issued to J. K. Clemens, on Oct. 15, 1974, and entitled "INFORMATION RECORDS AND RECORDING/PLAYBACK SYSTEMS THEREFOR".

In the video disc systems of the aforementioned Clemens' type, it has been recognized that a predetermined speed relationship must be maintained between the disc record and the signal pickup to obtain accurate reproduction of the prerecorded signals. The predetermined speed and specified tolerance limits are also necessary to assure that the recovered horizontal and vertical synchronizing information is stable and within the lockup range of the deflection circuits of the television receiver. Moreover, when the prerecorded information is a color television signal with chrominance information recorded as a modulated carrier signal, the recovered signal must be stable and within the lockup range of the color processing circuits of the playback system in order to minimize color phase distortion.

The pickup/record speed errors could be minimized by employing precision components and design. However, this would be expensive and further, the wear and tear of the components during operation would require continuous readjustments. Consequently, it is desirable to provide an inexpensive system for automatically maintaining the rotation of the turntable at the predetermined speed. A speed control system is disclosed in the copending U.S. patent application, Ser. No. 478,653, filed June 12, 1974, for C. D. Boltz, entitled "TIMING ERROR DETECTING AND SPEED CONTROL SYSTEM", and now U.S. Pat. No. 3,940,556. The Boltz system uses the timing information included in the prerecorded signal developed at the output of the signal pickup to generate an error correction signal for maintaining the turntable rotation at the predetermined speed. It is noted that, when the system is initially switched on, the signals are absent until the signal pickup is properly riding in the information carrying groove and relative motion is established between the disc record and the signal pickup. Due to the absence of timing information during this interim period, the speed control system has no way of knowing the speed error and therefore the control system response during this interim start-up period must be arbitrary. Besides initial start-up period, the arbitrary response due to absence of signals at the output of the signal pickup could occur under certain other conditions: for example, signal dropouts on the disc record, interval between disc record changes, etc., to name a few. The present invention is advantageous in that the turntable speed control system does not depend upon the signal developed at the output of the signal pickup for the development of the error correction signal.

In the past, some speed control systems have employed frequency discrimination principle for generating the speed error correction signal. In these systems, the error correction signal is a function of the speed error, or in other words, frequency differential between the output signal and the reference signal. Therefore, the error correction signal must be zero or arbitrary when there is no speed error (i.e., frequency differential). Due to the necessity of a speed error for development of the error correction signal, such systems normally have built-in residual error. The present invention employs phase error detection principle for generating the speed error correction signal. In these systems, the error correction signal is a function of phase (i.e., integral of frequency) differential between the output signal and the reference signal. Therefore, the error correction signal (a function of phase difference) could be developed without any speed error (i.e., frequency differential). Typically, the phase detection speed control systems are relatively free from built-in residual error.

SUMMARY OF THE INVENTION

In a video disc system for recovering prerecorded signals by a signal pickup from a disc record when a predetermined speed of relative motion is established between the signal pickup and the disc record, a turntable speed control system is provided. A turntable is provided for supporting and establishing rotation of the disc record. Drive means are provided for driving the turntable at a speed above the predetermined speed. Means responsive to the rotation of the turntable generate a train of sample pulses having a frequency which is a function of the actual speed of rotation of the turntable. The sampling pulses occur at a predetermined frequency when the turntable rotation is maintained at the predetermined speed. Means are provided for generating a sawtoothed-shaped reference wave having a frequency which is a multiple, including one, of the predetermined frequency of the sample pulses. Control means are coupled to the sample pulse generating means and reference wave generating means for determining the magnitude of the reference wave during the occurrence of each of the sample pulses for developing a speed error correction signal. The magnitude of the error correction signal is a function of the phase deviation between the sample pulse train and the reference wave. Adjusting means, responsive to the error correction signal and coupled to the control means, maintains the rotation of the turntable at the predetermined speed.

A complete understanding of the present invention may be obtained from the following detailed description of a specific embodiment thereof when taken in conjunction with the accompanying drawings, in which:

FIG. 2 is a schematic circuit diagram, partly in block form, of the turntable speed control system of FIG. 1;

DESCRIPTION OF THE INVENTION

Figure 1:
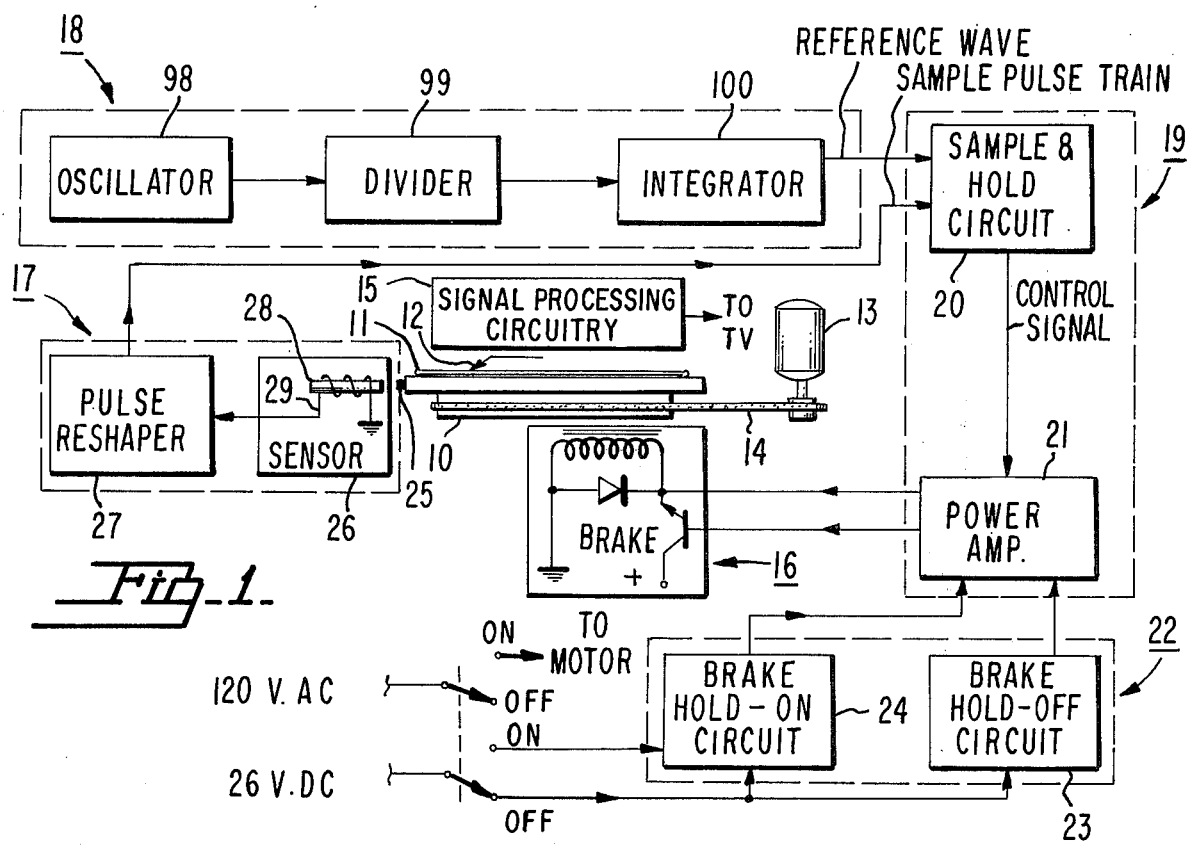
FIG. 1 is a block diagram of a turntable speed control system embodying the present invention.

FIG. 1 illustrates a playback apparatus comprising a motorboard having a turntable 10 rotatably mounted thereon. The playback apparatus is suitable for use in video disc systems such as disclosed in the aforementioned Clemens' patent (U.S. Pat. No. 3,842,194). The surface of the turntable 10 is adapted to support a disc record 11. A signal pickup 12, including a conductive surface, is subject to positioning in an information carrying groove on the surface of the disc record 11. A suitable turntable drive mechanism, including a motor 13 and a belt 14, drives the turntable 10 and thereby establishes relative motion between the disc record 11 and the signal pickup 12. Video information is contained in the geometric variations in the bottom of the smooth spiral groove of the disc record 11. The disc record 11 surface includes a coating of conductive material which is preferably covered with a thin deposit of dielectric material. The signal pickup 12 including the conductive surface engages the spiral groove and cooperates with the conductive coating and dielectric deposit on the disc record 11 to form a capacitor. As the disc record is rotated, the signal pickup 12 while riding in the groove recovers capacitive variations due to the geometric variations in the bottom of the spiral groove. The capacitive variations, indicative of prerecorded information, are applied to a suitable signal processing circuit 15 and a composite video signal obtained therefrom may be coupled to a conventional television receiver (not shown) for reproduction.

As indicated before, for accurate reproduction of the prerecorded signals, the systems of the above-mentioned Clemens' type require a predetermined speed of relative motion between the disc record 11 and the signal pickup 12. The turntable motor 13 drives the turntable 10 via the belt 14 at a speed above the predetermined speed. A braking system 16, responsive to a speed error correction signal (as indicated below), is coupled to the turntable 10 for maintaining the rotation of the turntable at the predetermined speed. A suitable drive motor for the player is the synchronous motor shown in a U.S. Pat. No. 3,848,146, issued to J. A. Tourtellot et al., and entitled "AC MOTOR". A suitable belt for the player is shown in a U.S. patent application, Ser. No. 480,329, filed June 18, 1974, for J. C. Schopp et al., entitled "DISC PLAYBACK SYSTEM WITH SPEED CONTROL OF A BELT DRIVE", and now U.S. Pat. No. 3,873,765. A suitable braking system for the player is shown in a U.S. Pat. No. 3,829,612, issued to B. W. Beyers, and entitled "SPEED CONTROL SYSTEM".

Briefly, the operation of the turntable speed control system is as follows. The output signals of sample pulse generating means 17 and reference wave generating means 18 are coupled to control means 19. The output signal of the sample pulse generating means 17 is a train of rectangular pulses having a frequency which is a function of the actual speed of rotation of the turntable. The sample pulses occur at a predetermined frequency (illustratively, 7.4925 Hz) when the turntable is rotating at the predetermined speed (e.g., 7.4925 rps.). The output signal of the reference wave means 18 is a sawtoothshaped reference wave having a frequency (illustratively, 97.4026 Hz) which is a multiple (e.g., 13), including one, of the predetermined frequency (in particular, 7.4925 Hz) of the sample pulses. The control means include a sample-and-hold circuit 20 and a power amplifier 21. The sample-and-hold circuit 20 determines and retains the magnitude of the reference wave during the occurrence of each of the sample pulses for developing a speed error correction signal. The magnitude of the error correction signal is a function of the phase deviation between the sample pulse train and the reference wave. The error correction signal is amplified by the power amplifier 21 and applied to the braking system 16. The braking system affects the drive means in a manner that keeps the turntable rotation substantially at the predetermined speed.

Sequencing means 22 are coupled to the power amplifier 21. The sequencing means 22 include a brake hold-off circuit 23 and a brake hold-on circuit 24. When the player is initially switched on, the brake hold-off circuit disables the braking system 16 for a small interval of time (illustratively, 5 seconds) to facilitate the drive means 13 to build up the speed of the turntable 10. When the player is switched off at the end of a playback cycle, the brake hold-on circuit 24 applies a signal to the power amplifier 21 which will result in a maximum braking force and therefore the turntable 10 would come to a quick stop from its high rotational speed.

Referring now to the schematic circuit diagram of FIG. 2, a ferromagnetic insert 25 is inserted into the periphery of the turntable 10. A magnetic sensor 26 is aligned adjacent to the periphery of the turntable 10. The magnetic sensor includes a permanent magnet 28 and a coil 29 wound on the magnet. During the rotation of the turntable as the ferromagnetic insert 25 moves past the magnet 28, the reluctance to the magnetic flux path momentarily drops and therefore the flux increases for a brief interval of time. The change in flux induces emf in the coil 29 which appears across the capacitor 30; the magnitude of the induced emf is proportional to the rate of change of the flux. In this specific embodiment of the present invention one pulse is developed for each revolution of the turntable 10.

Figure 3:
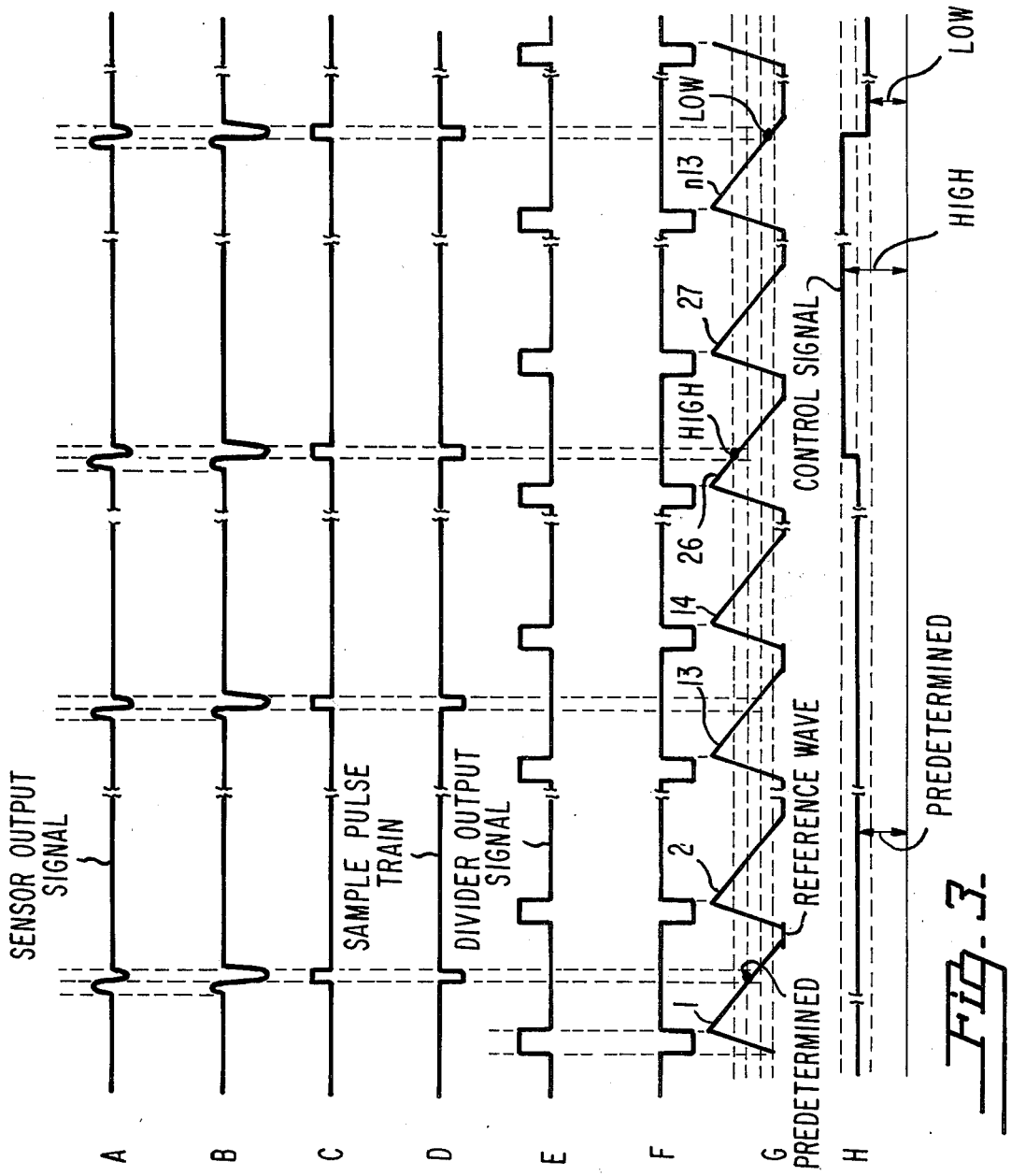
FIG. 3 illustrates waveforms associated with a portion of the circuit of FIGS. 1 and 2.

Referring now to FIGS. 2 and 3, the voltage (waveform A of FIG. 3) appearing across the capacitor 30 of the pulse shaper 27, is coupled via a capacitor 31 to the base of a grounded emitter transistor 32 (waveform B of FIG. 3). A biasing resistor 33 is coupled between a source of supply voltage (+15 V) and the base of the transistor 32. A load resistor 34 is coupled between the source of supply voltage and the collector of the transistor 32. The transistor 32 is normally conducting and is cutoff during the negative-going portion of the induced emf. The output voltage at the collector of the transistor 32 (waveform C of FIG. 3) is coupled to the emitter of a grounded base transistor 35 via a capacitor 36 and a resistor 37. A biasing resistor 38 is coupled between the emitter of the transistor 35 and ground. A load resistor 39 couples the output of the transistor 35 (waveform D of FIG. 3) to the pin 5 of the sample-andhold circuit 20. The transistor 35 is normally cutoff but conducts briefly when the transistor 32 is cutoff.

The reference wave means is comprised of an oscillator 98, a frequency divider 99 responsive to the output of the oscillator, and an integrator 100 responsive to the output of the frequency divider. In this specific embodiment the oscillator 98 is a crystal oscillator operating at U.S. Pat. No. 3,579,545 Hz., and included in the disc playback system for use in conjunction with color stabilization circuitry. The divider includes (a) four, four-bit binary counters (41 through 44) . . . each four-bit binary counter in turn consists of four master-slave flip-flops connected so as to divide the input frequency by a number 16, (b) one eight-input positive NAND gate 45, and (c) one quadruple two-input positive NAND gate 46. The aforementioned counters 41 through 44, eight-input NAND gate 45, and quadruple NAND gate 46 may be integrated circuits SN7493, SN7430, SN7400 sold by Texas Instruments. The integrated circuits are described in a Texas Instruments publication, "The TTL Data Book for Design Engineers", First Edition (1973), which may be obtained from Texas Instruments, Dallas, Tex. The frequency divider 99 converts the input signal of frequency U.S. Pat. No. 3,579,545 Hz. by a number 36,750 to develop an output signal having a frequency of 97.4026 Hz. (which is 13 times the predetermined frequency 7.4925 Hz. of the sampling pulse train). A multiple of greater than one was chosen in recognition that such choice would desirably reduce system lock-up (pull-in) time. However, it was observed that if the multiple choice it too large, the system stablility is endangered. The choice of 13 was found to give satisfactory operating results, while allowing the simplification of the speed control system. The basic operation of the frequency divider circuit is as follows. Four counters are connected in series and each counter produces an output pulse for every 16th input pulse. The maximum countdown capacity of the four counters is 65,536 (16 × 16 × 16 × 16 = 65,536). In this specific embodiment of the present invention the maximum countdown capacity is not completely utilized. The eight-input positive NAND gate 45 and the quadruple two-input positive NAND gate 46 together detect the countdown of 36,750 and then reset the four counters 41 through 44. In other words, for every 36,750 input pulses the divider develops one output pulse. The binary equivalent of the decimal number 36,750 is 1000, 1111, 1000, 1110. The reverse order (the least significant digit first, then the second least significant and so on) of the binary equivalent of the decimal number 36,750 is 0111, 0001, 1111, 0001. Therefore, whenever the output signal at the pins 11, 9, 8 of the first counter 41, pin 11 of the second counter 42, pins 1, 11, 9, 8 of the third counter 43, and the pin 11 of the fourth counter 44 becomes one, the counters are reset to zero and the sequence of events repeat. When the eight-output pins of the counters 41, 42, and 43 become one, the output of eight-input NAND gate 45 becomes zero. The quadruple two-input NAND gate 46 includes inverters 47 and 49 and a NAND gate 48. When the output of the eight-input NAND gate 45 becomes zero, the output of inverter 47 becomes one. The output of the inverter 47 and the pin 11 of the counter 44 (which is one at the count of 36,750) is coupled to the NAND gate 48. When both inputs to the NAND gate 48 are one, the output of the gate becomes zero. The output of the gate 48 is inverted by the inverter 49 and is then coupled to the reset pins of the four counters 41 through 44. Therefore when the appropriate pins of the four counters 41 through 44 become one, the eight-input NAND gate 45 and the quadruple two-input NAND gate 46 detect the status as such and reset the four counters in order to repeat the whole sequence. The output of the frequency divider 99 is shown by the waveform E of FIG. 3 having a frequency of 97.4026 Hz.

The output of the divider 99 is connected via a resistor 50 and appears across a resistor 51 coupled between the base of a grounded emitter transistor 52 and ground. The collector of the transistor 52 is coupled via a load resistor 53 to the source of supply voltage (+15 V). The normally cutoff transistor 52 conducts when the positive pulse appears at the base. The output of the transistor 52 (waveform F of FIG. 3) is coupled via a resistor 54 to the base of a transistor 55. The emitter of the transistor 55 is coupled to the source of supply voltage (+15 V). The transistor 55 conducts when the transistor 52 conducts and charges a capacitor 56 (waveform G of FIG. 3) through a resistor 57. A limiting diode 58 is connected across the capacitor 56 to prevent the voltage across the capacitor from becoming more negative than the setoff voltage of the diode. When the transistor 55 is cutoff, between input pulses from the divider, the capacitor 56 discharges (waveform G of FIG. 3) via a relatively large resistor 59 (illustratively, 150 Kilohms) to a sink voltage (of −15 volts) until it reaches the setoff voltage of the diode 58. The negative sink voltage and relatively large resistor 59 are provided in order to obtain a substantially linear discharge.

The voltage appearing across the capacitor 56 (waveform G of FIG. 3) is coupled to the pin 3 of an operational transconductance amplifier 60 of the sample-and-hold circuit 20. The sample-and-hold circuit may include an integrated circuit of the type CA 3080 sold by the RCA Corporation. The integrated circuit is described in an RCA publication entitled, "RCA Solid State Data Book", Series SSD-201A (1973), which may be obtained from RCA Electronics Components, Harrison, N.J. The basic operation of the sample-and-hold circuit is as follows. The operational transconductance amplifier 60 amplifies the voltage differential between the pins 2 and 3 during the occurrence of each sample pulse at the pin 5 supplied by the sample pulse means 17. The output of the operational amplifier 60 is coupled to the pin G of a field-effect transistor 61. The field-effect transistor may be of the type RCA 3N138 insulated-gate field-effect transistor MOS/FET) also described in the aforementioned "RCA Solid State Data Book". The output at the pin S of the field-effect transistor 61 is fed back to pin 2 of the operational amplifier 60. The output voltage at the pin S of the field-effect transistor 61 is the reference wave voltage at the pin 3 of the operational amplifier during the occurrence of the sample pulse, less setoff voltage of the operational amplifier. The output of the field-effect transistor 61 (waveform H of FIG. 3) appears across the series connected resistors 63 and 64. A potentiometer 65 is provided for selecting proper voltage to be applied to the power amplifier 21 so as to initially adjust the actual speed of the turntable near the predetermined speed.

The output of the sample-and-hold circuit 20 is coupled via resistors 66 and 67 to the base of a transistor 68. A capacitor 69 is coupled between the base of the transistor 68 and ground. The biasing resistor 70 and the load resistor 71 are coupled between (a) the emitter and ground, and (b) the collector and a source of supply voltage (+26 V), respectively, of the transistor 68. The voltage appearing at the collector of the transistor 68 is coupled to the base of a transistor 72. A biasing resistor 73 and load resistor 74 are coupled between (1) the source of supply voltage (+26 V) and the emitter, and (2) between ground and the collector, respectively, of the transistor 72. The voltage appearing at the collector of the transistor 72 is coupled to the base of a transistor 75 of the braking system 16. The voltage appearing at the emitter of the transistor 68 is coupled via resistors 76, 77, and a capacitor 78 to the collector of the transistor 75. The braking system 16 is of the type described in U.S. Pat. No. 3,829,612, issued to B. W. Beyers, and entitled "SPEED CONTROL SYSTEM".

Briefly, the braking system includes a conductive turntable driven at a speed above the predetermined speed. A magnetic field generating structure 79 is situated adjacent to the turntable and animated by a transistor 75 responsive to a speed error correction signal (waveform H of FIG. 3). The magnitude of the error correction signal is a function of the phase deviation between the sample pulse train and the reference wave. The resulting magnetic field establishes eddy currents in the conductive turntable 10 which creates a braking force that tends to oppose the rotation of the turntable in a manner that keeps the turntable rotation at the predetermined speed. A diode 80 is connected across the field generating structure 79 to prevent a high kickback voltage from damaging the field generating structure.

The operation of the turntable speed control system will not be recapitulated. As indicated before, the magnitude of the speed error correction signal is a function of the phase deviation between the sample pulse train (waveform D) and the reference wave (waveform G). The instantaneous frequency of the sample pulses is proportional (here, one-to-one) to the actual speed of rotation of the turntable 10. The sample pulses occur at the predetermined frequency when the turntable 10 is rotating at the desired predetermined speed. The sawtooth-shaped reference wave has a frequency which is a multiple (here, 13) of the predetermined frequency. The sawtooth-shaped (waveform G, FIG. 3) reference wave preferably has the ramp (rising) portion which is relatively steeper than the slope (falling) portion. Such a shape is desirable to assure that the system tends to settle on the slope portion in the steady state operation, instead of the ramp portion. The sample-and-hold circuit 20 determines the value of the reference wave during the occurrence of each of the sample pulses. In the steady state the turntable 10 rotates at the predetermined speed. The sample pulses (waveform D in FIG. 3) occur once every thirteenth reference wave cycle (waveform G in FIG. 3); the sample pulses would be positioned approximately in the middle of the corresponding reference wave slope portions and the magnitude of the error correction signal would be at the predetermined level as shown in waveform H of FIG. 3. At this juncture it is noted that the motor 13 (FIG. 1) persistently urges the turntable 10 to rotate at a speed above the predetermined speed. The predetermined level of the error correction signal would cause the braking system 16 to apply the requisite amount of braking force to the turntable 10 and thereby maintain the turntable rotation at the predetermined speed against the tendency of the motor to overdrive. Now, let us assume that an external disturbance causes a slight increase in the turntable speed. If the turntable speed were correct, the next sample pulse would be positioned in the middle of the corresponding (e.g., twenty-sixth in FIG. 3) reference wave. However, due to the increase in the turntable speed, the next sample pulse would actually occur slightly early (higher-up along the slope portion) and the magnitude of the error correction signal (shown as "high" in FIG. 3) would increase above the predetermined level. The increase in the magnitude of the error correction signal would increase the braking force tending to bring the turntable rotation rate back to the predetermined speed. If the external disturbance would persist in keeping the turntable rotation above the predetermined speed, the next sample pulse would occur further higher-up along the slope of the corresponding reference wave, and the magnitude of the error correction signal would rise still higher. Note the cumulative (integrating) effect. For a constant speed error (for example, +0.1 rps.) the magnitude of the error correction signal, within the limits of the control system, would keep on increasing or building up along the time axis. Thus, it may be seen that the control system opposes any speed increase. Again the control system also opposes any speed reduction essentially in a similar way. The reduction in the turntable speed would cause decrease in the magnitude of the error correction signal, and the magnitude of the error correction signal, within the limits of the turntable control system, would keep on decreasing along the time axis if the turntable insists on rotating below the predetermined speed.

When the turntable speed control system is switched on initially, if the turntable rotation were above the predetermined speed, the sample pulses would tend to position themselves higher-up along the slopes of the corresponding reference waves and thereby increasing the magnitude of the error correction signal and the braking force tending to oppose the higher speed. Similarly, when the turntable speed control system is switched on initially, if the turntable rotation were below the predetermined speed, the sample pulses would tend to situate themselves further down along the slopes of the corresponding reference waves and thereby decreasing the magnitude of the braking force tending to encourage the turntable rotation to return to the predetermined speed. Thus, when the turntable speed control system is initially switched on, it encourages the turntable to quickly attain the predetermined speed, and thereafter opposes any deviation from the predetermined speed.

Figure 4:
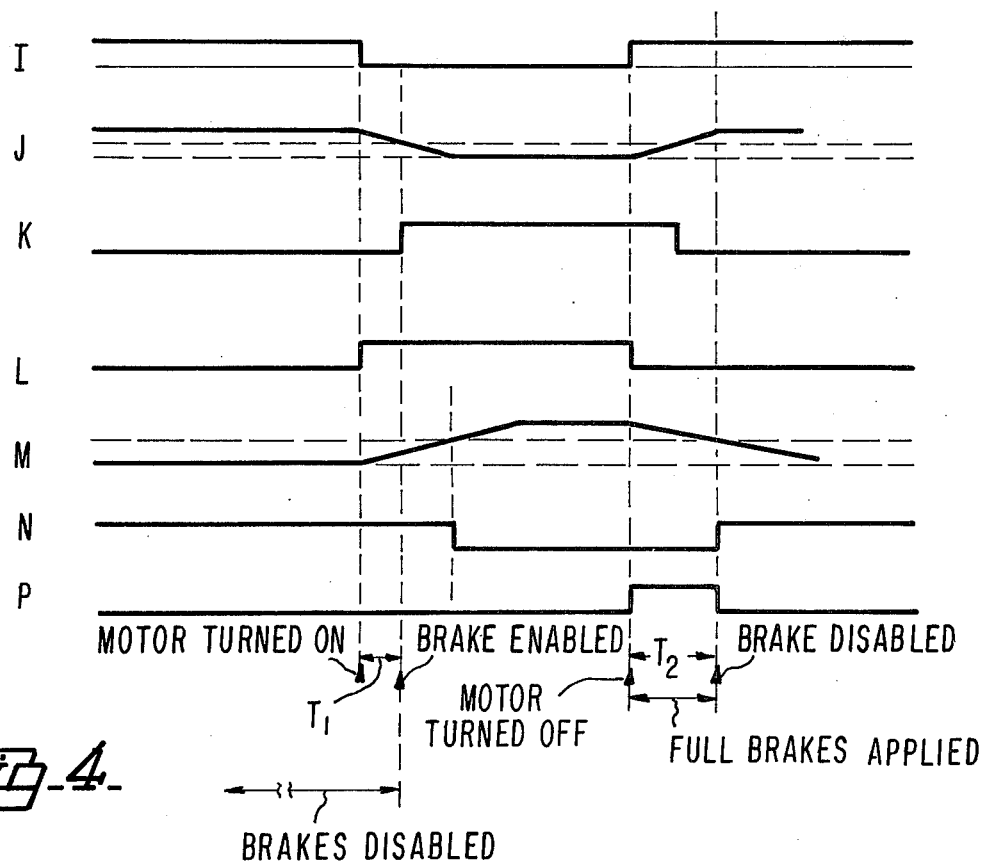
FIG. 4 illustrates waveforms associated with the remaining portion of the circuit of FIGS. 1 and 2, depicting sequencing at the beginning and at the end of a playback cycle.

The arrangement and operation of the sequencing means 22 will now be explained by reference to the circuit diagram of FIG. 2 in conjunction with the wave diagram illustrated in FIG. 4. The brake hold-off circuit 23 is provided to disable the brakes (no braking force), when the player is initially turned on, for a small interval of time (e.g., 5 seconds) to enable the drive means 13 to quickly build up the turntable speed to the free running speed. The initial disablement of brakes is desirable in order to (a) minimize start-up time by quickly attaining operating state, and (b) to prevent the drive motor 13 from demanding damagingly excessive starting currents. The arrangement and operation of the brake hold-off circuit 23 is as follows. While the motor 13 remains turned off, a source of supply voltage (waveform I of FIG. 4) is coupled to a capacitor 84 via a diode 82 and a resistor 83. The capacitor 84 charges (waveform J of FIG. 4) through the diode 82 and the resistor 83 and the resulting voltage across the capacitor 84 is coupled to the base of a grounded emitter transistor 81 via a resistor 85. The transistor 81 normally conducts while the motor 13 remains switched off. The waveform K of FIG. 4 illustrates the voltage appearing at the collector of the transistor 81. When the transistor 81 conducts, the capacitor 69 of the power amplifier 21 discharges to ground and cuts off the transistor 68 to disable the braking system 16. When the turntable motor 13 is initially turned on, the source of supply voltage (waveform I of FIG. 4) across the capacitor 84 is removed, and the capacitor discharges via resistors 85 and 86 to ground (waveform J of FIG. 4). The diode 82 prevents the capacitor from discharging through the resistor 83. When the voltage across the capacitor 84 reaches the transistor 81 cutoff point, after a time interval $T_1$ (see FIG. 4), the transistor 81 is turned off and thereby allows the braking system 16 to respond to the error correction signal free from the influence of the brake hold-off circuit 23.

The brake hold-on circuit 24 is provided to bring the turntable to a quick stop after the turntable motor 13 is turned off. As relatively high rotational speeds are typically employed in the video disc systems, the turntable has a tendency to keep on rotating for an extended period after the turntable motor is turned off. The brake hold-on circuit 24 cures the aforementioned problem by applying full brakes for an interval of time $T_2$ (see FIG. 4) after the motor 13 is turned off. The arrangement and operation of the brake hold-on circuit 24 will now be explained. When the motor 13 remains turned on, a capacitor 89 charges (waveform M of FIG. 4) via a resistor 88 through a diode 87 to the source of supply voltage (waveform L of FIG. 4). The voltage across the capacitor 89 is coupled via a resistor 90 to the base of a grounded emitter transistor 92. When the voltage across the capacitor 89 reaches the firing potential of the transistor 92, the transistor 92 is turned on (waveform N of FIG. 4). The collector of the transistor 92 is coupled to the base of a transistor 93 via a biasing resistor 94. A resistor 95 is coupled between the base of the transistor 93 and the supply voltage to insure that the transistor 93 cuts off when the transistor 92 cuts off. A capacitor 96 is coupled between the junction of the emitter and the supply voltage and ground. The collector of the transistor 93 is connected via a resistor 101 to the base of the transistor 68 of the power amplifier 21. The waveform P of FIG. 4 appears at the collector of the transistor 93. Due to lack of proper operating potentials, the transistor 93 remains normally cut-off and the power amplifier 21 is free from influence of the brake hold-on circuit 24 while the motor 13 remains turned on. When the motor 13 is turned off, the source of supply voltage (+26 V) is coupled to the emitter of the transistor 93 via a diode 97 and therefore the transistor 93 is turned on as illustrated by the waveform P of FIG. 4. The base of the transistor 68 of the power amplifier 21 is coupled to the source of supply voltage (+26 V) via the transistor 93 and the diode 97. Due to the application of maximum voltage to the base of the transistor 68, full brakes are applied. After the motor is turned off, the capacitor 89 discharges to ground via resistors 90 and 91 as illustrated by waveform M of FIG. 4. The diode 87 prevents the capacitor 89 from discharging through the resistor 88. When the voltage across the capacitor 89 reaches cut-off voltage of the transistor 92 after a time interval $T_2$ (see FIG. 4), the transistor 92 is cut-off as shown by the waveform N of FIG. 4. When the transistor 92 is cut-off, the transistor 93 is also turned off as shown by the waveform P of FIG. 4 and the brakes are disabled.

Thus, the turntable speed control system pursuant to the principles of the present invention provides a speed error correction signal, the magnitude of which is a function of the differential between the actual turntable speed and the predetermined turntable speed. The adjusting means responsive to the control signal affect the rotation of the turntable in a manner that maintains the rotation of the turntable at the predetermined speed.

It is noted that the turntable speed control system does not depend upon the signal developed at the output of the pickup for generation of the control signal. Also use of the phase detection principle for development of the control system results in a relatively accurate speed control system virtually free from built-in residual error.

Illustratively, the values of the circuit elements of FIG. 2 are as follows:

| I. CAPACITORS: | |
|---|---|
| Capacitor 30 | 0.1 Microfarad |
| Capacitor 31 | 0.1 Microfarad |
| Capacitor 36 | 0.1 Microfarad |
| Capacitor 56 | 0.1 Microfarad |
| Capacitor 69 | 0.1 Microfarad |
| Capacitor 78 | 47.0 Microfarads |
| Capacitor 84 | 6.8 Microfarads |
| Capacitor 89 | 10.0 Microfarads |
| Capacitor 96 | 0.01 Microfarad |
| II. RESISTORS: | |
| Resistor 33 | 27 Kilohms |
| Resistor 34 | 1.5 Kilohms |
| Resistor 37 | 4.7 Kilohms |
| Resistor 38 | 1.5 Kilohms |
| Resistor 39 | 27 Kilohms |
| Resistor 50 | 150 Kilohms |
| Resistor 51 | 120 Kilohms |
| Resistor 53 | 330 Kilohms |
| Resistor 54 | 150 Kilohms |
| Resistor 57 | 15 Kilohms |
| Resistor 59 | 150 Kilohms |
| Resistor (Variable) 63 | 2.5 Kilohms |
| Resistor 64 | 470 Kilohms |
| Resistor 66 | 10 Kilohms |
| Resistor 67 | 10 Kilohms |
| Resistor 70 | 1 Kilohm |
| Resistor 71 | 10 Kilohms |
| Resistor 73 | 0.047 Kilohms |
| Resistor 74 | 4.7 Kilohms |
| Resistor 76 | 6.8 Kilohms |
| Resistor 77 | 6.8 Kilohms |
| Resistor 83 | 1 Kilohm |
| Resistor 85 | 330 Kilohms |
| Resistor 86 | 47 Kilohms |
| Resistor 88 | 150 Kilohms |
| Resistor 90 | 1000 Kilohms |
| Resistor 91 | 220 Kilohms |
| Resistor 94 | 1000 Kilohms |
| Resistor 95 | 470 Kilohms |
| Resistor 101 | 33 Kilohms |
| III. TRANSISTORS: | |
| Transistors 32, 52 and 81 | 2N3565 |
| Transistors 35, 55 and 93 | 2N4248 |
| Field-Effect Transistor | 2N5458 |
| Transistor 68 | 2N3568 |
| Transistor 72 | MPSA55 |
| Transistor 75 | 2N5296 |
| Transistor 92 | MPSA20 |
| IV. DIODES: | |
| Diode 58 | IN60 |
| Diodes 80, 82, 87 and 97 | IN4002 |
| V. INTEGRATED CIRCUITS: | |
| 4-Bit Binary Counters 41 through 44 | SN7493 |
| 8-Input Positive NAND gate 45 | SN7430 |
| Quadruple 2-Input Positive NAND Gate 4 | SN7400 |
| Operational Transconductance Amplifier | CA3080, RCA |

What is claimed is:

1. In a system for playing back prerecorded information by a signal pickup from a disc record when relative motion is established therebetween; the playback system including a turntable for rotatably supporting the disc record; wherein for accurate reproduction of the prerecorded signals, a predetermined speed of rotation of the turntable is desired; the playback system including drive means for driving the turntable to rotate at a free running speed above the predetermined speed; adjusting means coupled to the drive means and responsive to a speed error correction signal for maintaining the speed of rotation of the turntable at the predetermined speed during playback; the system further including a signal processing circuit responsive to signals developed at the output of the signal pickup; the signal processing circuit including means for effecting frequency stabilization of components of the developed signals; a turntable speed control system comprising:
   1. means responsive to the rotation of the turntable for generating a train of speed indicating pulses having a frequency which is a multiple, including one, of the actual speed of rotation of the turntable; the speed indicating pulses occurring at a predetermined frequency when the speed of rotation of the turntable is at the predetermined speed;
   2. means for generating generally sawtooth-shaped reference waves having a frequency which is a greater-than-one multiple of the predetermined frequency of the speed indicating pulses; the reference wave generating means comprising an oscillator, a frequency divider responsive to the output of the oscillator, and an integrator circuit responsive to the output of the frequency divider for developing the sawtooth-shaped reference waves; the output of the oscillator being additionally supplied to the frequency stabilization effecting means;
   3. means coupled to the speed indicating pulse generating means and the reference wave generating means, and responsive to the magnitude of the reference wave during the occurrence of each of the speed indicating pulses, for developing a speed error correction signal; the magnitude of the speed error correction signal being a function of the phase deviation between the speed indicating pulse train and the reference wave; and
   4. means for supplying the speed error correction signal to the adjusting means for adjusting the speed of rotation of the turntable to the predetermined speed.

2. A system as defined in claim 1 wherein the turntable includes a conductive portion, and the adjusting means comprise a magnitude field generating structure situated adjacent to the turntable and responsive to the speed error correction signal for establishing eddy currents in the conductive turntable portion, and wherein the eddy currents develop a braking force in a manner that adjusts the speed of rotation of the turntable to the predetermined speed.

3. A system as defined in claim 1 wherein the speed indicating pulse generating means include a ferromagnetic insert affixed to the periphery of the turntable, a permanent magnet positioned near the periphery of the turntable, and a coil wound on the permanent magnet for detecting change in flux for developing the speed indicating pulses.

4. A system as defined in claim 1 wherein the speed error correction signal developing means include a sample-and-hold circuit for determining and retaining the magnitude of the reference wave during the occurrence of each of the speed indicating pulses for developing the speed error correction signal.

5. A system as defined in claim 1 wherein the frequency of the speed indicating pulses is equal to the speed of rotation of the turntable.

6. A system as defined in claim 1 further including means for suppressing the speed error correction signal supplying means during generation of the speed indicating pulses for a short interval of time after the drive means are initially switched on for playback to facilitate the drive means to quickly approach the free running speed.

7. A system as defined in claim 1 further including means for augmenting the speed error correction signal supplied to the adjusting means to develop maximum opposition to rotation of the turntable for a short interval of time after the drive means are switched off following playback to bring the turntable to a quick stop.

8. A system as defined in claim 1 wherein the frequency of the reference wave is a 13-or-under multiple of the predetermined frequency of the speed indicating pulses.

9. A system for recovering prerecorded information from a disc record by a signal pickup when relative motion is established therebetween comprising the combination of:
   1. a turntable for rotatably supporting the disc record; a predetermined speed of rotation of the turntable being desireable for accurate reproduction of the prerecorded information;
   2. driving means for driving the turntable to rotate at a free running speed above the predetermined speed;
   3. adjusting means coupled to the drive means and responsive to a speed error correction signal for maintaining the speed of rotation of the turntable at the predetermined speed during playback;
   4. an oscillator;
   5. a signal processing circuit responsive to signals developed at the output of the signal pickup; the signal processing circuit including means responsive to an output of the oscillator for effecting frequency stabilization of components of the developed signals;
   6. means responsive to the rotation of the turntable for generating a train of speed indicating pulses having a frequency which is a multiple, including one, of the actual speed of rotation of the turntable; the speed indicating pulses occurring at a predetermined frequency when the speed of rotation of the turntable is at the predetermined speed;
   7. means for generating generally sawtooth-shaped reference waves having a frequency which is a greater-than-one, but less-than-14, multiple of the predetermined frequency of the speed indicating pulses; the reference wave generating means including a frequency divider responsive to the output of the oscillator, and an integrator circuit responsive to the output of the frequency divider for developing the sawtooth-shaped reference waves;
   8. means coupled to the speed indicating pulse generating means and the reference wave generating means, and responsive to the magnitude of the reference wave during the occurrence of each of the speed indicating pulses, for developing a speed error correction signal; the magnitude of the speed error correction signal being a function of the phase deviation between the speed indicating pulse train and the reference wave; and
   9. means for supplying the speed error correction signal to the adjusting means for adjusting the speed of rotation of the turntable to the predetermined speed.

* * * * *